United States Patent [19]
Takei

[11] Patent Number: 5,229,669
[45] Date of Patent: Jul. 20, 1993

[54] COMPACT LINEAR MOTOR DRIVE UNIT

[75] Inventor: Seiji Takei, Yokohama, Japan

[73] Assignee: Nippon Thompson Co., Ltd., Japan

[21] Appl. No.: 778,419

[22] Filed: Oct. 15, 1991

[30] Foreign Application Priority Data

Oct. 16, 1990 [JP] Japan .................. 2-275457

[51] Int. Cl.[5] ............... H02K 41/00; G11B 17/00
[52] U.S. Cl. ................... 310/12; 318/135; 369/249
[58] Field of Search ............. 310/12, 13, 14; 318/135; 360/78.13; 369/219, 249

[56] References Cited

U.S. PATENT DOCUMENTS

| | | | |
|---|---|---|---|
| 4,247,794 | 1/1981 | Jooss et al. | 310/13 |
| 4,439,698 | 3/1984 | Chen | 310/12 |
| 4,698,798 | 10/1987 | Faber et al. | 369/249 |
| 4,704,712 | 11/1987 | Siryj | 369/219 |
| 4,823,336 | 4/1989 | Inada et al. | 369/249 |
| 4,864,170 | 9/1989 | Eguchi | 310/12 |
| 4,922,143 | 5/1990 | Gosdowski et al. | 310/12 |
| 5,023,495 | 6/1991 | Ohsaka et al. | 310/12 |
| 5,072,144 | 12/1991 | Saito et al. | 310/12 |

Primary Examiner—Steven L. Stephan
Assistant Examiner—Matthew Nguyen
Attorney, Agent, or Firm—Skjerven, Morrill, MacPherson, Franklin & Friel

[57] ABSTRACT

A linear motor drive unit includes a rail, a slider, a plurality of rolling members interposed between the rail and the slider to provide a rolling contact between the slider and the rail, a pair of permanent bar magnets fixedly attached to the rail to provide a fixed magnetic flux along the longitudinal axis of the rail and a moving coil mounted on the slider. The moving coil extends around the slider, and it encloses a part of the rail and also a part of the magnets in a circumferential direction with a predetermined gap therebetween. The current flow through the moving coil is controlled to control the movement of the slider relative to the rail.

12 Claims, 2 Drawing Sheets

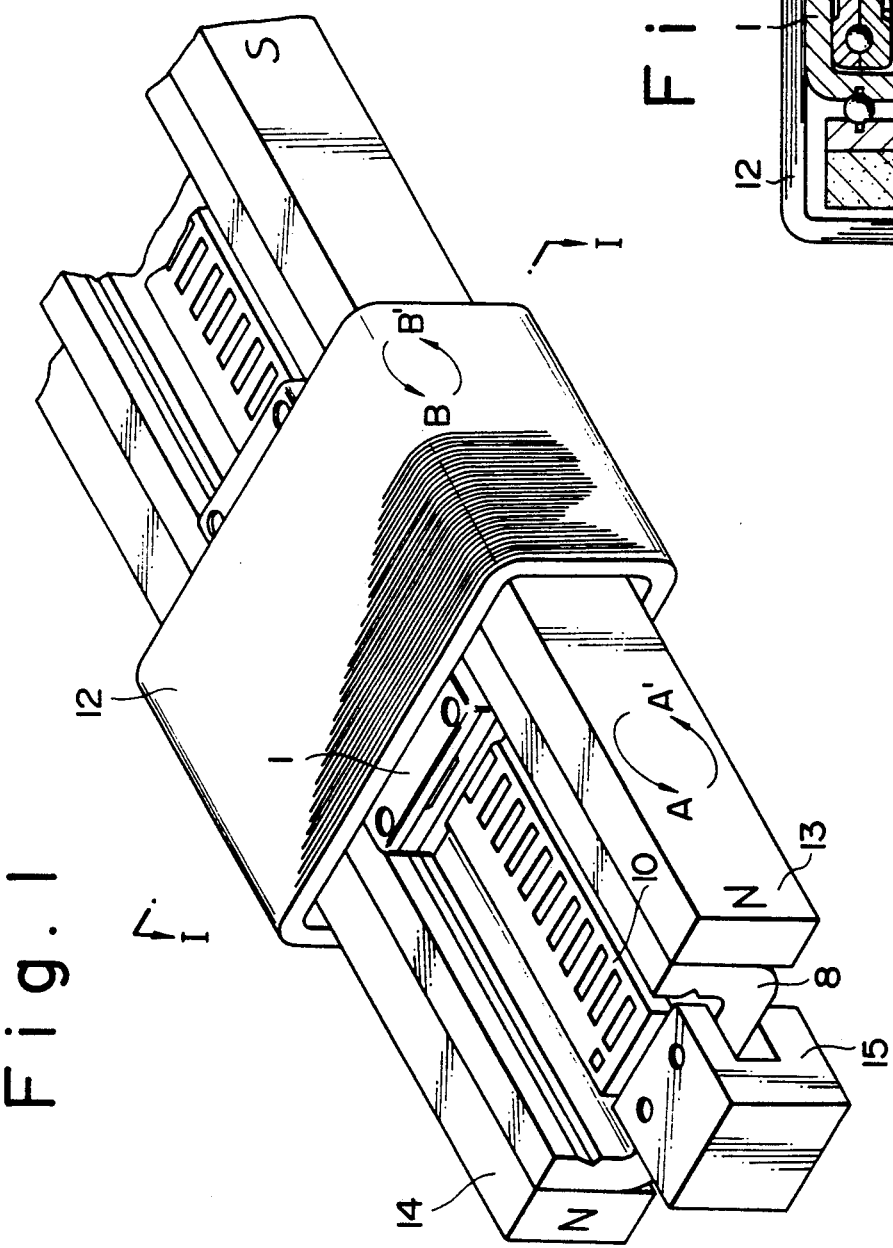
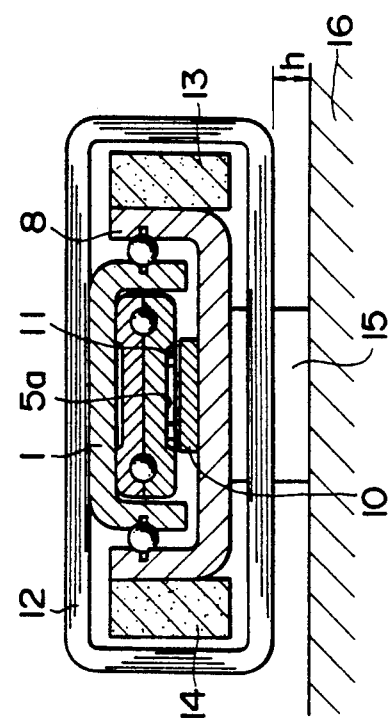

COMPACT LINEAR MOTOR DRIVE UNIT

BACKGROUND OF THE INVENTION

1. Field of the Invention

This invention generally relates to a linear motor drive unit compact in size and in particular to a linear motor drive unit including the basic structure of a linear motion rolling contact guide unit.

2. Description of the Prior Art

A linear motion rolling contact guide unit is well known in the art, and it generally includes a rail extending over a length, a slider and a plurality of rolling members, such as balls or rollers, interposed between the rail and the slider so that a relative linear motion may be provided between the rail and the slider. Such a linear motion rolling contact guide unit is typically combined with a linear motor as a driving source for driving to move the slider relative to the rail. Such a linear motor is typically provided separately from and connected to the slider of the linear motion rolling contact guide unit through an arm. Such a linear motor typically includes a structure which is obtained by developing the structure of a rotary motor, including a rotor, a stator and an air gap therebetween, along a straight line, and it is a device for converting electrical energy directly to linear motion energy.

However, such a prior art linear motor drive unit, which is a combination of a linear motion rolling contact guide unit and a linear motor, tends to be bulky in size, and, thus, its applications have been rather limited. In addition, since the linear motor is typically connected to the slider of the linear motion rolling contact guide unit through an elongated arm, the prior art linear motor drive unit tends to be inferior in rigidity.

SUMMARY OF THE INVENTION

In accordance with the present invention, there is provided an improved linear motor drive unit which generally includes a rail, a slider, a plurality of rolling members interposed between the rail and the slider, and driving means for driving the slider to move relative to the rail. The rail extends over a desired length and is provided with at least one first guiding means which extends in parallel with the longitudinal axis of the rail and which can receive at least some of the plurality of rolling members partly. Preferably, the rail has a generally U-shaped cross section, including a horizontal bottom section and a pair of vertical side sections extending upright from the opposite sides of the horizontal bottom section. And, an inner guide groove is provided in the inner surface of each of the vertical side sections of the rail.

The slider includes at least one second guiding means which is located opposite to the first guiding means of the rail when assembled and which can receive at least some of the plurality of rolling members partly. Preferably, the slider is provided with a pair of endless circulating paths, each including a load path section, a return path section and pair of curved connecting path sections which connect the corresponding ends of the load and return path sections. In this case, the plurality of rolling members may roll along each of the endless circulating paths endlessly. The load path section is defined by an outer guide groove which is located opposite to a corresponding one of the inner guide grooves, and the return path section extends generally in parallel with the load path section. Thus, a guide channel is defined by a pair of opposite inner and outer guide grooves, and those rolling members which are located in the guide channel are partly received in the inner guide groove and also partly received in the outer guide groove to thereby provide a rolling contact between the rail and the slider.

The driving means include a first means for producing a fixed magnetic flux in a predetermined direction, preferably along the longitudinal axis of the rail, and a second means directly mounted on the slider for producing a temporary magnetic flux which interacts with the fixed magnetic flux produced by the first means. Preferably, the first means includes at least one permanent magnet fixedly attached to the rail. In one embodiment, an elongated bar magnet is used. Preferably, a pair of such elongated bar magnets are fixedly attached to the pair of vertical side sections of the rail, respectively. The second means preferably includes at least one coil which is fixedly attached to the slider. In a preferred embodiment, the coil is fixedly attached to the slider and encloses the slider, the rail and the magnets attached to the rail in a circumferential direction around the longitudinal axis of the rail.

It is therefore a primary object of the present invention to provide an improved linear motor drive unit compact in size.

Another object of the present invention is to provide an improved linear motor drive unit sturdy and rigid in structure.

A further object of the present invention is to provide an improved linear motor drive unit having a combined structure between a linear motion rolling contact guide unit and a linear motor.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration showing in a perspective view a linear motor drive unit constructed in accordance with one embodiment of the present invention;

FIG. 2 is a schematic illustration showing the cross section of the linear motor drive unit of FIG. 1 taken along line I—I indicated in FIG. 1.

DESCRIPTION OF THE PREFERRED EMBODIMENTS

Figure 3:
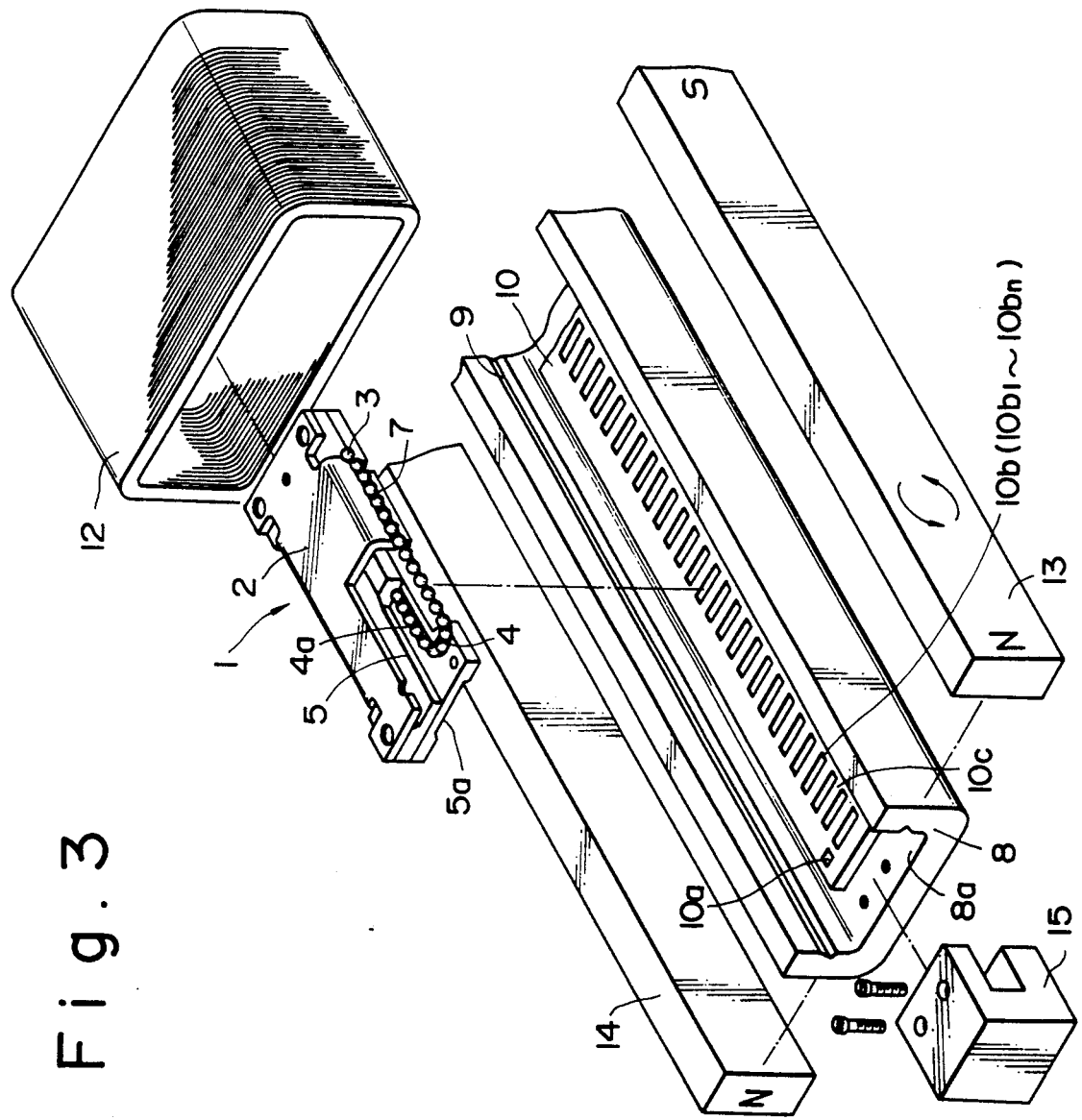
FIG. 3 is a schematic illustration showing in an exploded view of the linear motor drive unit shown in FIGS. 1 and 2.

Referring to FIGS. 1 through 3, there is schematically shown a linear motor drive unit constructed in accordance with one embodiment of the present invention. As shown, the present linear motor drive unit generally includes a slider 1, a rail 8, a plurality of balls 3, a pair of bar magnets 13 and 14 and a coil 12. It is to be noted that the illustrated linear motor drive unit is of the so-called indefinite linear motion type, i.e., the slider 1 being capable of moving over any distance as long as the rail 8 extends; however, the present invention should not be limited only to this particular type and it can equally applicable to the so-called definite linear motion type.

As shown in FIGS. 1 and 3, the rail 8 extends straight over a desired length and has a generally U-shaped cross section. Thus, the rail 8 in the illustrated embodiment includes a horizontal bottom section and a pair of vertical side sections which extend upright from the opposite sides of the horizontal bottom section. As indicated in FIG. 3, an outer guide groove 9 is formed in the inner surface of each of the pair of vertical side sections of the rail 8 and the outer guide groove 9 extends in parallel with the longitudinal axis of the rail 8.

As best shown in FIGS. 2 and 3, the slider 1 generally includes a casing 2 and a two-part circulator assembly 5 comprised of a pair of upper and lower circulator plates. The casing 2 has a generally inverted U-shaped cross section and thus it includes a horizontal top section and a pair of vertical side sections extending downward from the opposite sides of the horizontal top section. The casing 2 is formed with a plurality of mounting holes so that bolts or the like may be used to have the casing 2 and the circulator assembly 5 mounted together.

The slider 1, when assembled together by bringing the upper and lower circulator plates together and with the casing 2, is provided with a pair of endless circulating paths, each including a load path section 7, a return path section 4a and a pair of curved connecting path sections 4 connecting the corresponding ends of the load and return path sections as best shown in FIG. 3. A plurality of balls 3 are provided in each of the endless circulating paths such that they may roll along each of the paths endlessly in any direction. The load path section 7 also defines an inner guide groove located opposite to a corresponding outer guide groove 9 provided in the rail 8. Thus, a pair of oppositely located inner and outer guide grooves 7 and 9 defines a guide channel in which the balls 3 are partly received in both of the inner and outer guide grooves 7 and 9 to thereby provide a rolling contact between the slider 1 and the rail 8. In the illustrated embodiment, the inner guide groove or load path section 7 is formed in the outer surface of each of the side sections of the casing 2 and the rest of each of the endless circulating paths, i.e., the return path and curved connecting path sections, is formed in the circulator assembly 5.

In the illustrated embodiment, a bottom recess 5a is formed at the bottom of the circulator assembly 5 and a photoelectric sensor 11, including a light-emitting device and a light-receiving device, is provided in the bottom recess 5a as mounted on the slider 1. In addition, a scale plate 10 to be used for detecting the position of the slider 1 relative to the rail 8 is mounted on the rail 8 as fixedly attached to a top surface 8a of its bottom section. The scale plate 10 is elongated and extends in parallel with the longitudinal axis of the rail 8. The scale plate 10 is preferably comprised of a glass material or the like, and the top surface of the scale plate 10 is covered with a cover film of a predetermined material, such as chromium, by vapor deposition, the cover film being partly etched away to define a plurality of slits 10b (10bl–10bn) of predetermined shape and size at a predetermined pitch, each extending in a transverse direction relative to the longitudinal axis of the scale plate 10. With this structure, the chromium-covered surface section 10c defines a mirror surface to reflect light; whereas, the slits 10b allow the light to pass therethrough and thus effectively define a non-reflective surface section. The scale plate 10 is also formed with a square slit 10a which defines a reference position for the slider 1.

With the above-described structure, the light emitted from the light-emitting device of the photoelectric sensor 11 is incident upon the scale plate 10 and the light is reflected by or allowed to pass through the scale plate depending on where the light thus emitted is incident upon the scale plate. The light is reflected only when it is incident upon the reflecting surface section 10c of the scale plate and it is not reflected when it impinges upon any of the slits 10a and 10b. When the light is reflected, it is received by the light-receiving device of the photoelectric sensor 11, and thus the reflected light is converted into an electrical signal which may be processed, for example, by a microprocessor, thereby determining the location of the slider 1 relative to the rail 8 along its longitudinal axis. As a result, the slider 1 may be moved to and caused to stop any desired location along the longitudinal axis of the rail 8.

As best shown in FIGS. 1 and 3, a pair of permanent bar magnets 13 and 14 is fixedly attached to the pair of vertical side sections of the rail 8, respectively. Each of the bar magnets 13 and 14 is elongated in shape and has one pole at one end and the opposite pole at the other end. It is to be noted that each of the bar magnets 13 and 14 may be a collection of segmented magnets, and, alternatively, use may be made of any other means for producing a fixed magnetic flux which substantially extends along the longitudinal axis of the rail 8 as produced by the pair of bar magnets 13 and 14 in the illustrated embodiment. It should also be noted that the magnets 13 and 14 may be attached to any desired portion of the rail 8 other than the outer surfaces of the vertical side sections as shown.

A moving coil 12 is also provided as fixedly attached to the top surface of the slider 1. The moving coil 12 has a desired number of turns and it is sized such that it encloses the slider 1, part of the rail 8 and part of the magnets 13 and 14 circumferentially. In the illustrated embodiment, the coil 12 is generally rectangular in shape so as to minimize its size and overall size of the unit. However, the coil 12 may take any desired shape depending on applications. The coil 12 may be provided in any desired manner as long as at least a part of the fixed magnetic flux created by the magnets 13 and 14 pass through the interior of the coil 12. The coil 12 is electrically connected to a control circuit (not shown) which controls the magnitude and/or the direction of current through the coil 12. Thus, the speed and direction of movement of the slider 1 relative to the rail 8 can be controlled by controlling the current passing through the coil 12.

For example, when the current is passed through the coil 12 in one direction, a magnetic flux is temporarily produced by the coil 12 as indicated by arrows B and B' and this temporary magnetic flux interacts with the fixed magnetic flux created by the magnets 13 and 14 as indicated by arrows B and B' to thereby cause the slider 1 to move linearly relative to the rail 8 in one direction. When the direction of the current passing through the coil 12 is reversed, then the direction of the magnetic flux created by the coil 12 is reversed so that the slider 1 is now caused to move in the opposite direction linearly along the rail 8. The speed of movement of the slider 1 is determined by the magnitude of the current supplied to the coil 12.

In one embodiment, in accordance with a program stored in a memory (not shown) of the control circuit (not shown), the slider 1 is initially moved to one end of the rail 8 until the reference position 10a is detected. Upon detection of the reference position 10a, its location is stored in the memory as a reference position. Then the slider 1 is allowed to move to any desired location along the longitudinal axis of the rail 8 by detecting the number of slits 10b with the photoelectric sensor 11. In this manner, the slider 1 may be moved in either direction and located and stopped at any desired location along the longitudinal axis of the rail 8.

In the illustrated embodiment, a mounting block 15 for mounting the rail 8 to a base or support plate 16 is provided at each end of the rail 8. The mounting block 15 is generally C-shaped and its top section may be fixedly attached to one end of the rail 8 and its bottom section may be fixedly attached to the base 16. When the rail 8 is mounted in position by these mounting blocks 15, a gap having a height h is provided between the bottom surface of the moving coil 12 and the top surface of the base 16. Thus, in the illustrated embodiment, the coil 12 is spaced from the base 16 and also spaced from the magnets 13 and 14 and the rail 8 with predetermined gaps therebetween, excepting an abutment relation between the top surface of the slider 1 and the inner surface of the top section of the coil 12. Therefore, the coil 12 and the slider 1 may move together without any undesired friction relative to the rail 8.

It is to be noted that although use has been made of a photoelectric sensor for detecting the location of the slider 1 relative to the rail 8, use may be alternatively made of any other means for detecting the location of the slider 1 relative to the rail 8. For example, use may be made of a magnetic position detecting device using a Hall effect element and one or more magnets, or alternatively use may be made of the well-known gray codes in order to effect the detection of location of the slider 1 relative to the rail 8 digitally. In addition, although use has been made of balls 3 as rolling members, use may also be made of rollers. Furthermore, although the above-described embodiment is of the indefinite linear motion type, the present invention is equally applicable to the definite linear motion type having no endless circulating path.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motor drive unit, comprising:
a rail extending over a desired length, said rail including first guiding means extending in parallel with a longitudinal axis of said rail;
a slider including second guiding means located opposite to said first guiding means to thereby define a guide channel therebetween;
a plurality of rolling members provided at least in said guide channel to thereby provide a rolling contact between said slider and said rail;
first magnetic means elongated in shape and fixedly attached to said rail for producing a first magnetic flux along the longitudinal axis of said rail; and
second magnetic means mounted on said slider and fixedly attached to said slider for producing a second magnetic flux which can interact with said first magnetic flux, said second magnetic means being in the shape of a loop which surrounds said rail, said slider and said first magnetic means, said second magnetic means being spaced apart from said rail and said first magnetic means.

2. The drive unit of claim 1, wherein said first magnetic means includes at least one permanent magnet.

3. The drive unit of claim 2, wherein said permanent magnet is an elongated bar magnet fixedly attached to said rail in parallel with the longitudinal axis of said rail.

4. The drive unit of claim 3, wherein said rail is generally U-shaped and includes a horizontal bottom section and a pair of vertical side sections extending upright from said horizontal bottom section, and said bar magnet is fixedly attached to each of said side sections.

5. The drive unit of claim 4, wherein said bar magnet is fixedly attached to an outer surface of each of said side sections.

6. The drive unit of claim 1, wherein said second magnetic means includes a coil having a predetermined number of turns and said coil is fixedly attached to said slider to enclose at least said slider circumferentially.

7. The drive unit of claim 6, wherein said coil is sized so as to also enclose a part of said rail circumferentially as spaced apart therefrom.

8. The drive unit of claim 7, wherein said second magnetic means includes a pair of elongated bar magnets fixedly attached to said rail, and said coil also encloses a part of said bar magnets circumferentially as spaced apart therefrom.

9. The drive unit of claim 1, wherein said slider includes at least one endless circulating path including a load path section, a return path section and a pair of curved connecting path sections connecting corresponding ends of said load and return path sections, wherein said load path section defines said second guiding means.

10. The drive unit of claim 1, further comprising detecting means for detecting a location of said slider relative to said rail.

11. The drive unit of claim 10, wherein said detecting means includes first detecting means mounted on said slider and a second detecting means which cooperates with said first detecting means and which is mounted on said rail.

12. The drive unit of claim 1, further comprising mounting means for mounting said rail at a predetermined height above a base.

* * * * *